United States Patent [19]

Hashemnia

[11] Patent Number: 5,367,828
[45] Date of Patent: Nov. 29, 1994

[54] TWO-WAY VEHICLE DOOR

[76] Inventor: Ali N. Hashemnia, No. 882, 3rd Floor, Air France Building Enghelab Avenue, Tehran, Islamic Rep. of Iran

[21] Appl. No.: 107,922

[22] Filed: Aug. 17, 1993

[51] Int. Cl.⁵ .............................................. E05D 7/02
[52] U.S. Cl. ......................................... 49/382; 49/193
[58] Field of Search ................. 49/382, 192, 193, 381, 49/326; 16/357, 361

[56] References Cited

U.S. PATENT DOCUMENTS

| | | | |
|---|---|---|---|
| 4,503,582 | 3/1985 | Gurubatham | 49/382 X |
| 4,612,728 | 9/1986 | Moriyoshi | 49/382 X |
| 4,811,518 | 3/1989 | Ladisa | 49/382 |

FOREIGN PATENT DOCUMENTS

| | | | |
|---|---|---|---|
| 1578724 | 4/1969 | France | 49/382 |
| 0034451 | 3/1977 | Japan | 49/382 |
| 0048247 | 4/1977 | Japan | 49/382 |
| 0122232 | 10/1978 | Japan | 49/193 |
| 0146439 | 11/1979 | Japan | 49/193 |

Primary Examiner—Peter M. Cuomo
Assistant Examiner—Jerry Redman
Attorney, Agent, or Firm—Dominik, Stein, Saccocio, Reese, Cloitz & Van Der Wall

[57] ABSTRACT

A door, and particularly a door for a vehicle, which door can be made to pivot about two separate axis. The door is provided with first and second sets of hinge assemblies comprising releasable hinge pins and seating receptacles for lodging the hinge pins. Each set of hinge pins define one axis. Release of one set of hinge pins causes the door to be pivotable about the axis of the other set of hinge pins.

6 Claims, 4 Drawing Sheets

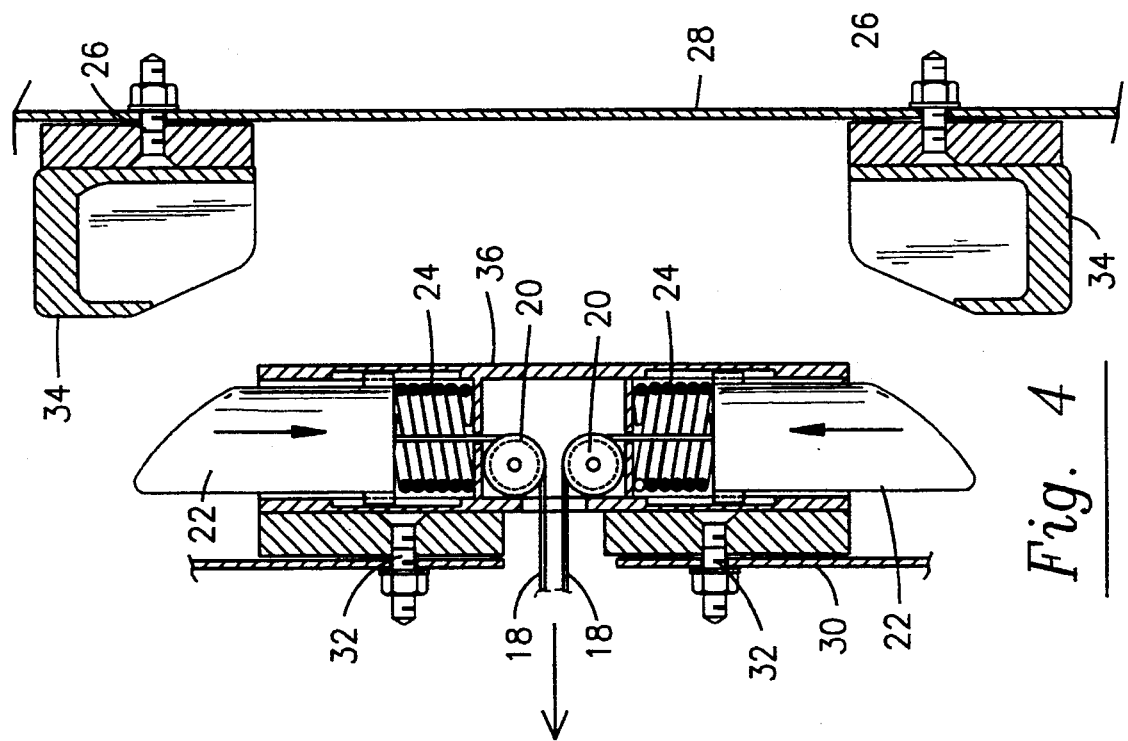
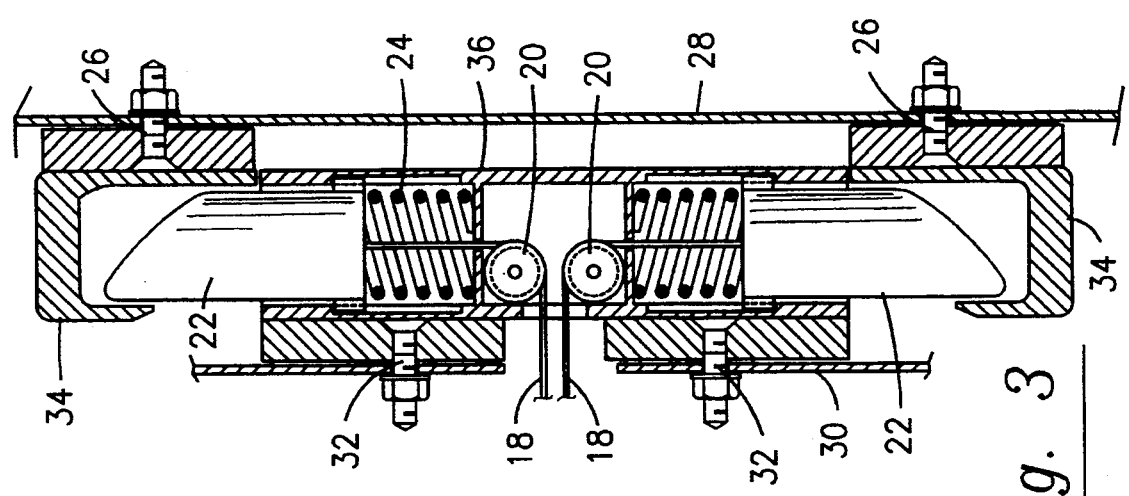

TWO-WAY VEHICLE DOOR

FIELD OF THE INVENTION

The present invention is directed to a door, and particularly a door for a vehicle, which door can be made to pivot about two separate axis. The door is provided with first and second sets of hinge assemblies comprising releasable hinge pins and seating receptacles for lodging the hinge pins. Each set of hinge pins define one axis. Release of one set of hinge pins causes the door to be pivotable about the axis defined by the other set of hinge pins.

BACKGROUND OF THE INVENTION

Side doors for vehicles, and in particularly automobiles, at least in the United States, are presently usually constructed so as to open forwards, i.e., the doors are hinged at the forward edge of the door and open from the rearward edge of the door. In many countries, vehicles are available with side doors constructed to open rearwards, i.e., the hinges are provided on the rearward edge of the door and the door is opened from the forward edge. Each of these designs has certain advantages and certain disadvantages.

For example, the door which is hinged at the forward edge and which opens in the forward direction is certainly a safer design in the case that the car door is opened while the automobile is traveling at high speed. In that case, the wind would simply urge the forward hinged door to close. However, a car door which is hinged at the forward edge blocks the exit of passengers, and makes egress more difficult. Further, in the case that a forward opening door is opened as a motorcyclist or bicyclist is passing the car, the door will "harpoon" the motorcyclist or bicyclist, and injuries are likely to result.

On the other hand, a door which hinges at the rearward edge and which can be opened towards the rear is a great convenience when exiting the car, since the door does not block the natural path of egress. Further, in the case that a passing bicyclist or motorcyclist accidentally runs into a rearward opening door, the door will simply cause the bicyclist or motorcyclist to glance off the door. However, in the case that the door which is hinged in the back is opened while the vehicle is traveling at a high rate of speed, the wind would cause the door to open violently and damage the vehicle door and the vehicle and possibly the occupants.

There is thus a need for a vehicle door which is free of the above-mentioned problems.

SUMMARY OF THE INVENTION

An object of the present invention is to provide a vehicle door which overcomes the above problems.

A further object of the invention is to provide a vehicle door hinging and latching system which enables an operator or passenger inside a vehicle to selectively open the door either towards the front or towards the back of the vehicle.

A further object of the invention is to provide a vehicle door which can be opened in more than one direction, so that there is a greater chance of opening the door in case of damage to the vehicle such as an automobile accident.

Yet a further object of the invention is to provide a door for the rear of a vehicle which can be selectively opened in one of two directions. More specifically, the rearward door should be constructed so as to be selectively opened either upward and downward, or towards the left and towards the right.

Yet another object of the invention is to provide a novel hinge system by which these objects can be accomplished.

These objects of the invention are accomplished with a novel door for a vehicle, the door being provided in association with a pair of hinge means, preferably but not necessarily at opposite edges of the door (e.g., at the forward edge of the door and at the rearward edge of the door). The hinges are of a novel design and each pair is capable of being caused to disengage by retraction of hinge pins from hinges. The retraction may be mechanically by action of a door handle, or it may be electrical, i.e., by using a solenoid to retract hinge pins, or the hinge pins may be withdrawn by pneumatic or hydraulic means. In one example, in the case of a side door, a first door handle can be provided for disengagement of the forward hinges, so that the door can be opened by pivoting outwardly and rearwardly about the rear hinges. Another handle can be provided on the same door for disengagement of the rearward hinges, so that the door can be opened by disengaging the rear hinge pins from their housings and pivoting the door out and in a forwardly direction about the forward hinges.

The same system of releasable door hinges can be reoriented to provide an upper pair of hinges having a horizontal axis and a lower pair of hinges having a horizontal axis. Two hinges are provided on an upper edge of a door and two hinges are provided on a lower edge of a door. In such an arrangement the door may be selectively caused to open either upwardly by disengagement of the lower hinges and or folding down.

In a yet further embodiment of the invention, retractable hinge pins may be provided oriented vertically at the corners of a door, so that a door may be caused to pivot in four different directions, i.e., out and left, out and right, in and left, in and right.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other vehicle doors for carrying out the same purposes of the present invention. It should also be realized by those skilled in the art that such equivalent structures do not depart from the spirit and scope of the invention as set forth in the appended claims.

BRIEF DESCRIPTION OF THE FIGURES

The present invention will become more fully understood from the detailed description given hereinbelow and the accompanying drawings which are given by way of illustration only and, thus, are not limitative of the present invention, and wherein:

FIG. 3 is a detailed view of the releasable hinges shown in the engaged position;

FIG. 4 is a detailed view of the releasable hinges of FIG. 3 but shown in the disengaged position and showing operation of the disengagement mechanism;

DETAILED DESCRIPTION OF THE INVENTION

It is believed that the manner in which the vehicle door according to the present invention is utilized will be readily apparent from the foregoing description, but the following detailed description will serve to further explain various and preferred modes of construction and utilization.

Figure 1:
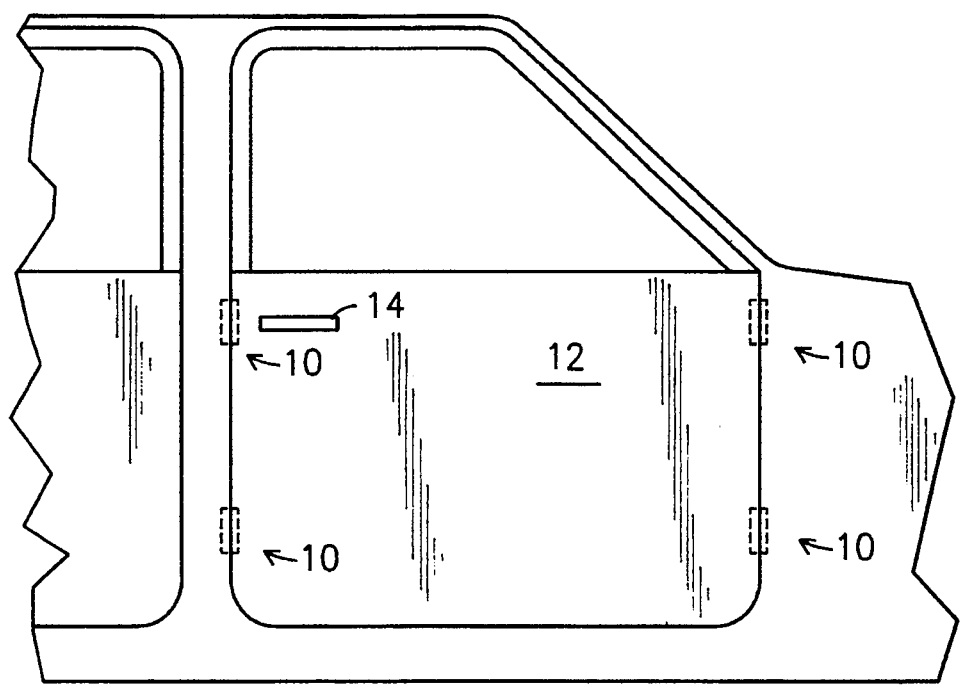
FIG. 1 is a side perspective partial view of an exterior of a vehicle showing the outer surface of a door provided with the releasable hinges of the present invention.

With reference to the figures, FIG. 1 is a side perspective partial view of an exterior of a vehicle showing the outer surface of a door 12, the arrangement of two pairs of hinges 10, and external door handle 14. It can be seen that, in the embodiment shown in FIG. 1, the longitudinal axis of the hinge pins, the axis of disengagement of the hinge pins, and the axis of rotation of the hinges are the same. That is, by releasing, e.g., the rear hinges, door 12 will pivot around engaged hinges about an axis. This pivot axis will be the same axis along which hinge pins are provided, and along which the hinge pins are displaceable for disengagement.

Figure 2:
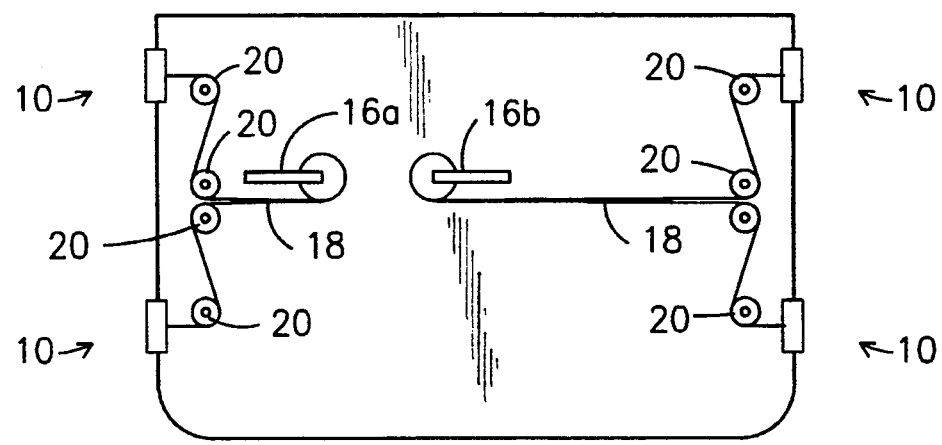
FIG. 2 is a side perspective view of the interior workings of the side door.

FIG. 2 is a side perspective view of the interior workings of the side door. Rear door handle lever 16a can be depressed to cause cable 18 to be pulled through pulleys 20. Likewise, forward handle 16b can be depressed to pull forward cable 18 through pulleys 20. The relation of the cables to the hinges is shown in FIGS. 3 and 4. In FIG. 3, first and second hinge pin housings 34 are secured to automobile frame 28 by means of metal fasteners 26. At least a part of first and second retractable hinge pins 22 are seated pivotably within said hinge pin housings 34 and are urged into a seating position by biasing means such as springs 24. The other part of said retractable hinge pins is seated in a receptacle 36 which is fixed to the side door by means of metal fasteners 32. Pulling of the cable 18, as by depressing lever 16b, overcomes the biasing effect of springs 24 and retraction of the hinge pins 22 and disengagement of the hinge pins 22 from the housing 34 in which they were seated.

Although not shown, it is readily apparent that any hardware conventionally provided in doors of this type may be included in the door of the present invention, and the details thereof need not be discussed here. For example, the manner of providing the exterior door release, the interior door releases, wire harnesses, latch mechanisms, window, regulator mechanisms and trim may be provided in the manner set forth in U.S. Pat. Nos. 5,095,659, 5,092,647, 4,993,763, and 4,771,575, the disclosure of which is incorporated herein by reference.

Figure 5:
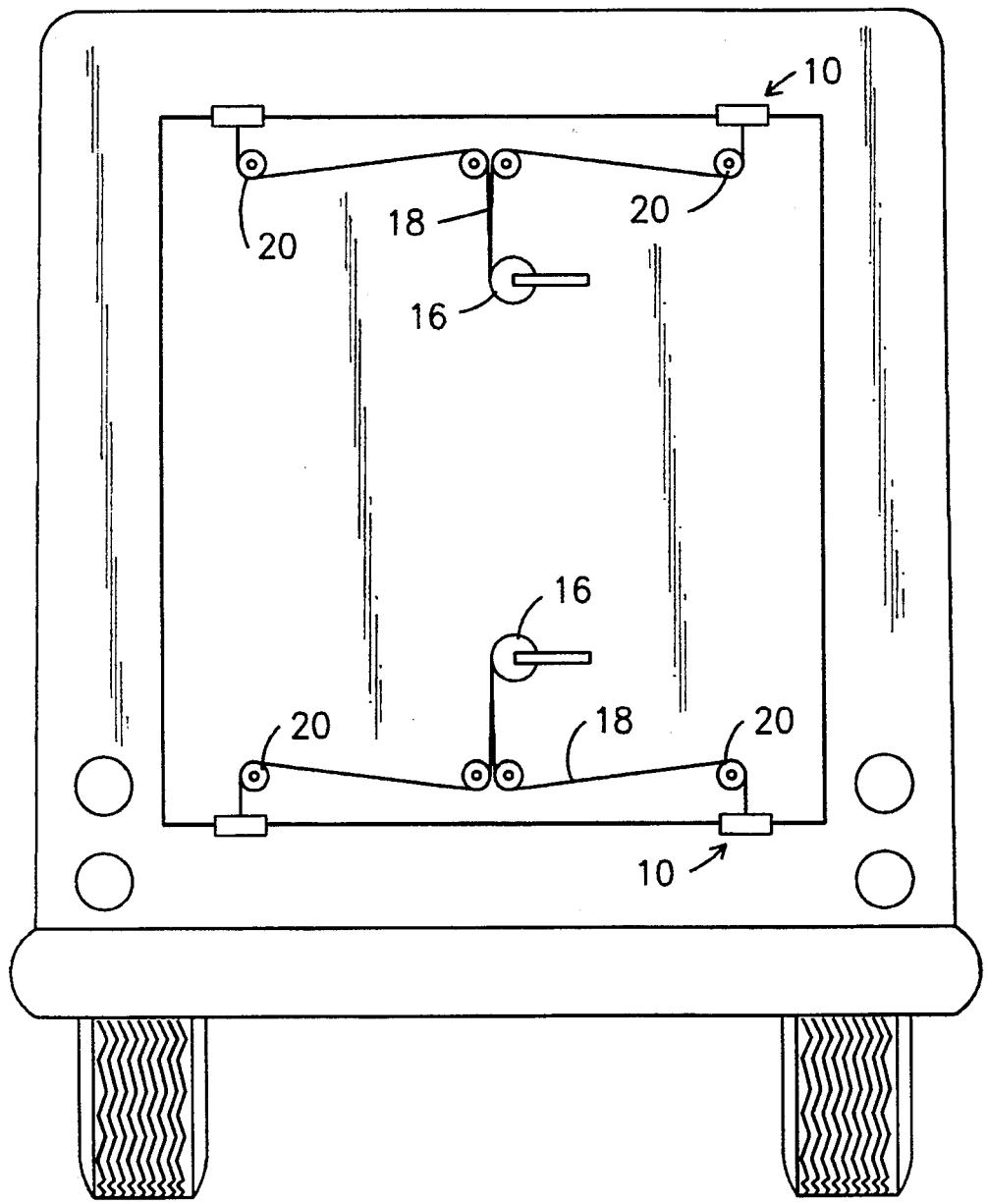
FIG. 5 is an elevated view of a rear of a vehicle, showing an arrangement by which a hatch in the rear of the vehicle can be tilted up or folded down.

In a further embodiment of the invention, the same type of arrangement as made in FIGS. 1-4 may be rotated to the configuration for a rear door as shown in FIG. 5. In the embodiment shown in FIG. 5, the lower hinge pins 10 may be released and the rear hatch may be pivoted upwardly by means of the upper engaged hinge pins 10. Alternatively, the upper hinge pins may be disengaged and the rear hatch may be folded down by means of engaged lower pins.

Figure 6:
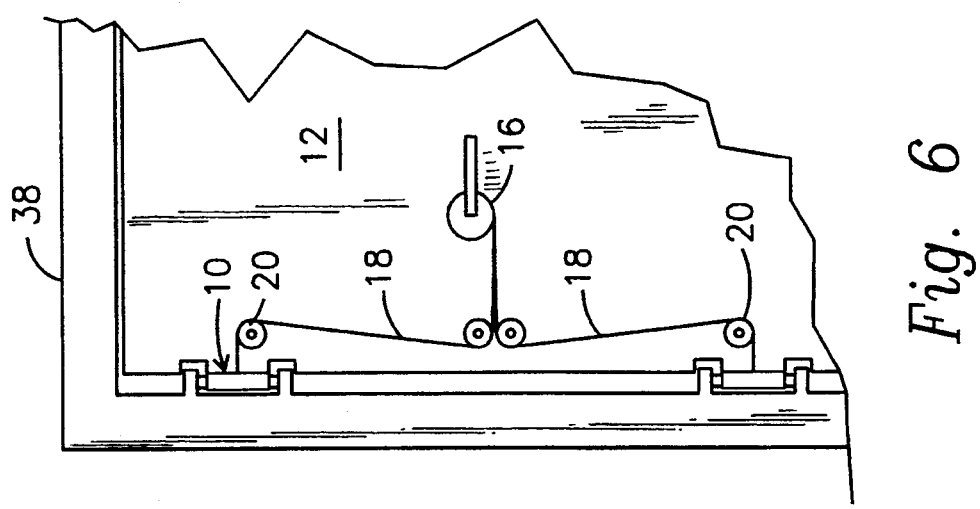
FIG. 6 is a side perspective view of a door for a building, the door being releasable on either the left side or the right side, and capable of swinging either outwardly or inwardly when released on one side.

In yet a further embodiment of the invention, the arrangement of FIG. 1 can be adapted to a door for a building. As seen in FIG. 6, door 12 is provided in association with frame 38. Hinge pins 22 are seated in housing 34. Pulling of the cable 18, as by depressing lever 16, overcomes the biasing effect of springs 24 and retraction of the hinge pins 22 and disengagement of the hinge pins 22 from the housing 34 in which they were seated.

Figure 7:
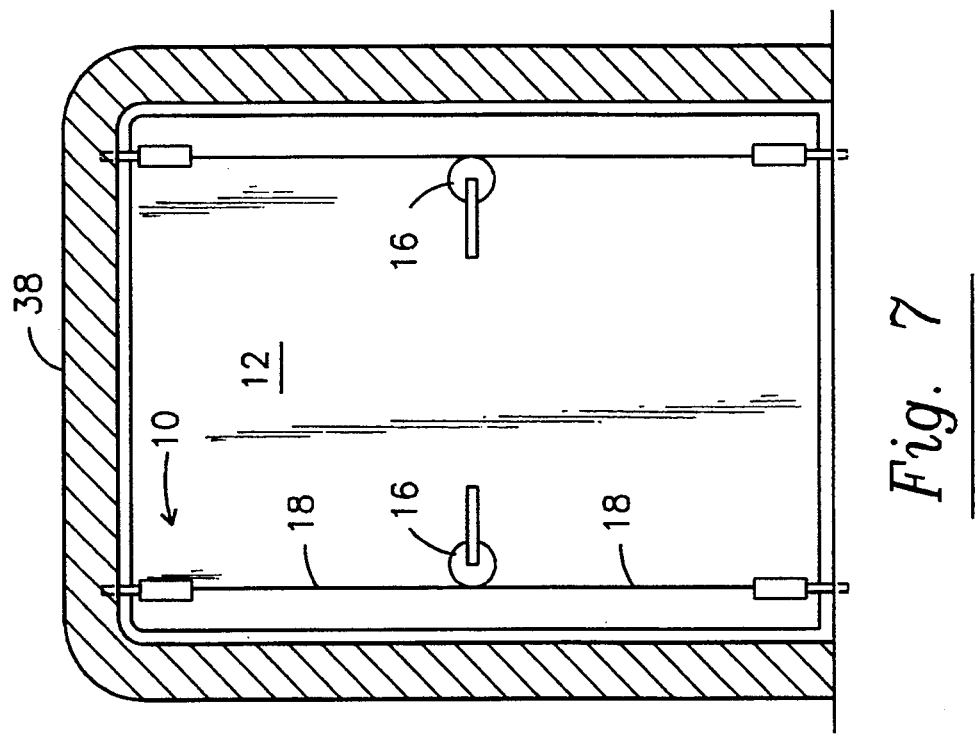
FIG. 7 is a different embodiment showing a door which can be released from either the left or right side, and opened inwardly or outwardly.

Another embodiment of the present invention is shown in FIG. 7. In this figure, rotating the door handle by means of lever 16 pulls cable 18 and causes retraction of upper and lower hinge pins from their sockets on one side of the door. It is readily apparent that each of the hinge assemblies need be comprised of only a single hinge pin for engaging either the upper beam or the floor in the case of a building door. Upon retraction of the hinge pins, the door is free to pivot around the axis of rotation of the remaining, engaged hinge pins. FIG. 7b is a top view of the door of FIG. 7a, showing the positioning of hinge pins 22. It should be noted that the embodiment shown in FIG. 7a lends itself to a wide variety of uses. For example, the arrangement of FIG. 7a can be employed to provide a series of adjacent doors along one side of a railroad box car. Any of these doors could be opened either inwardly or outwardly, and from either the left or the right. Thus, any desirable opening can be provided in the side of the box car.

Various modifications can be made without departing from the scope of the invention. Various alternative hinge, release, handle, and locking means arrangements can be employed and the door or vehicle body can have a different initial shape. Although the vehicle door was first designed as a door for an automobile, and thus is particularly suited for an automobile, it will be readily apparent that the vehicle door can be used in all manner enclosures, including hunting blinds, refrigerators, etc. Although this invention has been described in its preferred forth with a certain degree of particularity with respect to vehicle doors, it is understood that the present disclosure of the preferred form has been made only by way of example and that numerous changes in the details of structures and the arrangement of the various parts may be resorted to without departing from the spirit and scope of the invention.

Now that the invention has been described,

What is claimed is:

1. A door assembly adapted to being pivotably about two different axis, said door assembly comprising
    a door shell adapted to fit over an opening,
    a first set of retractable hinge pins disposed on said door shell with pin axis and retraction axis along a first axis and adapted to releasably engage a first set of hinge pin receptacles associated with said opening,
    a second set of retractable hinge pins disposed on said door shell with pin axis and retraction axis along a second axis different from said first axis, said second set of retractable hinge pins adapted to releasably engage a second set of hinge pin receptacles associated with said opening, spring means for urging said retractable hinge pins into said hinge pin receptacles means for selectively retracting said first set of retractable hinge pins, and means for selectively retracting said second set of retractable hinge pins, whereby said door assembly is capable of being mounted on said opening by the engagement of said first and second set of retractable hinge pins with said first and second set of hinge pin receptacles, respectively, and whereby the retraction of one set of hinge pins from said hinge pin receptacles along one of said first or second axis causes the door to be pivotable about the other of said first or second axis by means of the other of said set of hinge pins.

2. A door as in claim 1, wherein said first and second axis are parallel.

3. A door as in claim 1, wherein said first set of retractable hinge pins comprises a first and a second retractable hinge pin assembly, each hinge pin assembly being comprised of a first and a second retractable hinge pin and a hinge plate, each hinge pin having a projecting end and a seating end, said hinge plate adapted to receiving the seating end of said hinge pin, and said first and second hinge pin being on the same axis but with projecting ends being in opposite directions.

4. A door assembly as in claim 1, wherein said means for retracting the hinge pins from the hinge receptacle comprises a cable attached to a handle.

5. A vehicle door assembly for a vehicle, said vehicle comprising a cabin having at least one opening adapted to receiving a vehicle door, said vehicle door adapted to being pivotable about two different axis when mounted, said door assembly comprising a vehicle door shell adapted to fit over an opening of a vehicle, a first set of retractable hinge pins disposed on said vehicle door shell with pin axis and retraction axis along a first axis and adapted to releasably engage a first set of hinge pin receptacles associated with said vehicle opening, a second set of retractable hinge pins disposed on said vehicle door shell with pin axis and retraction axis along a second axis, said second set of retractable hinge pins adapted to releasably engage a second set of hinge pin receptacles associated with said vehicle opening, said second axis being different from said first axis, means for selectively retracting said first set of retractable hinge pins, and means for selectively retracting said second set of retractable hinge pins, spring means for urging said retractable hinge pins into said hinge pin receptacles whereby said door assembly is capable of being mounted on a vehicle by the engagement of said first and second set of retractable hinge pins with said first and second set of hinge pin receptacles, respectively, and whereby the retraction of one set of hinge pins from said hinge pin receptacles along one of said first and second axis causes the door to be pivotable about the other of said first and second axis by means of the other of said set of hinge pins.

6. A vehicle door assembly for a vehicle as in claim 5, wherein said first set of retractable hinge pins comprises a first and a second retractable hinge pin assembly, each hinge pin assembly being comprised of a first and a second retractable hinge pin and a hinge plate, each hinge pin having a projecting end and a seating end, said hinge plate adapted to receiving the seating end of said hinge pin, and said first and second hinge pin being on the same axis but with projecting ends being in opposite directions.

* * * * *